Sept. 28, 1926.

W. K. HOWE 1,601,363

APPARATUS FOR TESTING INDUCTIVE TRAIN CONTROL DEVICES

Filed March 4, 1922

Winthrop K. Howe,
INVENTOR

BY Neil D. Preston,
his ATTORNEY

Patented Sept. 28, 1926.

1,601,363

UNITED STATES PATENT OFFICE.

WINTHROP KEITH HOWE, OF ROCHESTER, NEW YORK, ASSIGNOR TO GENERAL RAILWAY SIGNAL COMPANY, OF GATES, NEW YORK, A CORPORATION OF NEW YORK.

APPARATUS FOR TESTING INDUCTIVE TRAIN-CONTROL DEVICES.

Application filed March 4, 1922. Serial No. 541,226.

This invention relates to apparatus for testing inductive influence communicating means employed in automatic train control systems for railroads.

In a train control system for railroads, it is necessary to communicate controlling influences from the trackway to moving vehicles for the purpose of governing the operation of suitable brake control mechanism on the vehicle, so that the vehicle may be slowed down or stopped when necessary. For reasons well recognized by those skilled in the art, it is desirable to communicate these influences, without physical contact, through an intervening air gap; and the principle of magnetic or electro-magnetic induction is found particularly suitable for this purpose. In the design and development of the appropriate car and trackway equipment to suit various operating conditions, it becomes desirable to observe the performance of such apparatus under varying conditions of speed, air gap, voltages, currents, size, proportion of parts, and the like. It will be evident that it would be very difficult and tedious to run such a series of tests with a locomotive or other vehicle on the railroad; and in accordance with the present invention, there is contemplated the provision of a testing apparatus by means of which tests may be easily and quickly run under any desired range of variation in practical working conditions, such testing apparatus being constructed so as to reproduce accurately all of the phenomena and performance actually occurring in practice.

Generally speaking, the invention contemplates a rotary member, carrying one element of the influence communicating means, which can be driven at various speeds to carry said element past a stationary element constituting the other part of the influence communicating system. The testing apparatus of this invention also provides suitable means for indicating the speed of relative movement of the elements of the influence communicating combination, and suitable devices for affording the necessary electrical connections and permitting the segregation of a particular influence or impulse from those closely preceding or following it.

Other objects and advantages of the invention will appear as the description progresses.

In describing the invention in detail reference will be made to the accompanying drawing, in which:—

In general, the embodiment of the invention illustrated comprises a rotatable frame F, conveniently termed a rotor, which carries an element L, a driving means for rotating the frame illustrated as a motor M, a speed indicating device G; devices for electrically communicating between the rotating element L and the ground, illustrated as a collecting ring and brush construction C; and a selecting device D for selecting and transmitting only one communicating influence out of a series of preceding and following influences.

Figure 1:
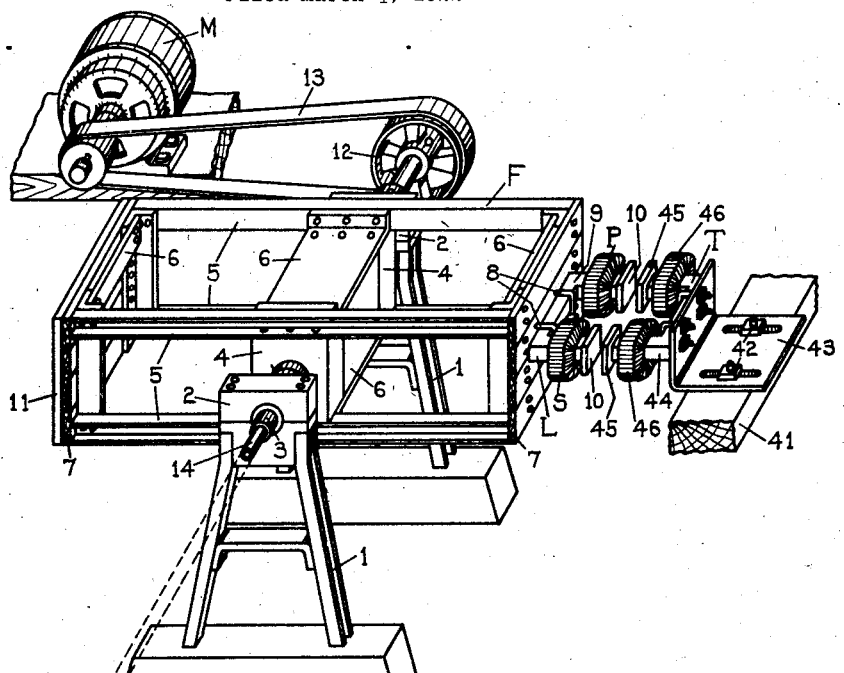
Fig. 1 is a diagrammatic and perspective view of a device embodying the present invention.

More specifically, the present embodiment as illustrated in Fig. 1 comprises a pair of pedestals 1, each provided with a bearing block 2 in which is journaled the main shaft 3. On the main shaft are fastened in a suitable manner two supporting blocks 4 carrying a frame or rotor F, comprising four channel members 5 and suitable cross members 6. Each end of the frame or rotor F is provided with cross planks 7 to facilitate the mounting of various types of elements to be tested thereon. On one end of the frame is shown a car element L adjustably supported by U-bolts 8 to the cross planks 7. This element may be adjusted endwise by sliding it under the U-bolts, which may then be tightened down.

The car element L of the train control apparatus illustrated under test comprises a U-shaped core 9 having its upstanding legs terminating in pole pieces 10, and having its legs provided with coils which in this particular instance comprise a primary coil P and a secondary coil S. The other end of the frame F is provided with a suitable counterweight 11 to properly balance the frame with the element about its axis of rotation. One end of the main shaft 3 is provided with a pulley 12 driven by the motor M through the belt 13. The motor M is preferably of a variable speed type, having shunt motor characteristics.

The other end of the main shaft 3 is hollowed a distance to the inside of the bearing block and then cross bored to permit a free passage of wires from the frame F through the shaft 3. In the hollowed end of the shaft is fastened a line shaft 14 of tubular form, which is supported in suitable bearings (not shown). The line shaft 14 is preferably connected to the main shaft 3 by a suitable flexible connection so that the necessary end play in the main bearings for mechanical clearance may be taken up without affecting the position of the line shaft. To this line shaft 14 is fixedly connected a beveled gear 15, which is in mesh with the beveled pinion 16 on the shaft of the speed responsive device G. Preferably this speed responsive device is calibrated to read the effective speed of the movable element in miles per hour.

At another point along the line shaft 14 is provided a train of reduction gears, consisting of a pinion 17 keyed to the shaft and meshing with a large spur gear 18, which has integral therewith a pinion 19 which is in mesh with another similar spur gear 20. This latter spur gear 20 is provided with a hub 21 having a rounded notch 22 cut therein. Adjacent the hub 21 is mounted a bell-crank 23 having its journals resting in suitable bearings (not shown). One end of the bell-crank 23 is provided with a roller 24 bearing against the outside of the hub 21 by the action of a spring 25, and the other end is provided with an insulating knob 26 bearing against and biasing a spring finger 27 which is supported by an insulating block 28.

Assuming the position of the apparatus as shown with the roller 24 resting on the hub 21 to be the normal position, and the position with the roller resting in the notch 22 to be in the abnormal position. Normally closed and normally open contacts 29 and 30, respectively, are provided as shown by arrows. This construction causes the normally closed contact 29 to open, and a normally open contact 30 to be closed intermittently as the train of gears are rotated. On the line shaft 14 is also provided an insulating sleeve 31, which has shrunk thereon a plurality of conducting rings 32, 33, 34 and 35. These collecting or slip rings are provided with insulated wires leading through the line shaft 14 and the main shaft 3 to the primary and secondary coils P and S of the car element L. Suitable collecting devices for making an electrical connection to the movable rings are provided, and in the present instance comprise an insulating block 36 having spring fingers or brushes 37, 38, 39 and 40 mounted thereon bearing against the several rings.

Adjacent the rotary member or frame F is supported a heavy timber 41 in any suitable manner. This timber 41 is provided with bolts 42 extending through cross slots in the angle bracket 43, so that the angle bracket 43 may be adjusted crosswise of the timber 41. Against this angle bracket 43 is bolted a track element T also comprising a U-shaped iron core 44, having pole pieces 45 and provided with a coil 46 on each of its legs. The adjustable construction of the mounting for the track element T with respect to the timber 41 allows variation of the air gap between the track element T and the car element L by adjusting the angle bracket with respect to said timber 41.

Figure 2:
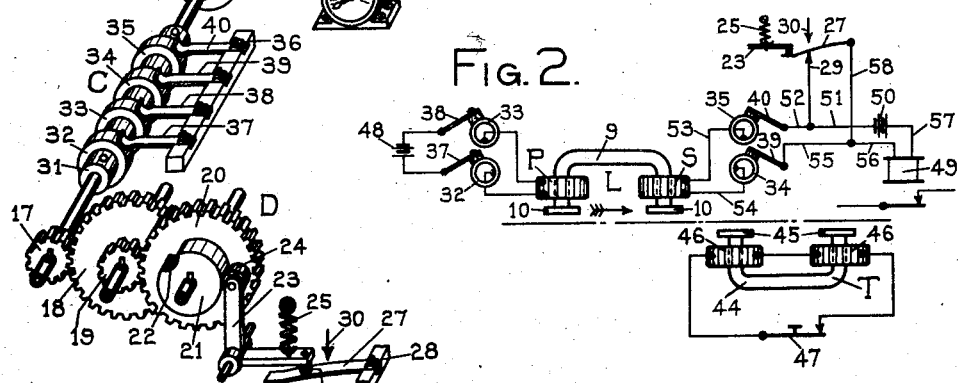
Fig. 2 is a simplified diagram of electrical circuits for one particular form of inductive train control system adapted to be tested by this apparatus.

One particular type of train control system which may be tested and carried through its experimental stages of development by this apparatus, simulating that of tests under actual working conditions, is diagrammatically shown in Fig. 2. In this particular system, the coils 46 of the stationary track element T are wound and connected in series so that a change of flux through the U-shaped core 44 will induce voltages in the coils 46 which will be cumulative, and these coils 46 are normally connected in a circuit of low resistance through the normally closed push button 47. The movable car element L, which moves in the direction of the arrow, has its primary coil P continuously energized through wires connected through two of the slip rings 32 and 33 to a suitable battery 48 connected thereto by the brushes 37 and 38, and has its secondary coil S connected to a suitable electro-responsive device 49 through the medium of the other two slip rings 34 and 35, brushes 39 and 40 contacting therewith and wires. In this latter circuit is connected a battery or other source of variable E. M. F., which may be adjusted to supply just sufficient current to maintain the relay energized. This circuit may be traced as follows:—Beginning at the battery 50, wires 51 and 52, brush 40, slip ring 35, wire 53, secondary coil S, wire 54, ring 34, brush 39, wires 55 and 56, winding of electro-responsive device 49, wire 57 back to the battery 50. The normally closed contacts 27 and 29 of the selector are shown connected across the brushes 39 and 40, thereby under normal conditions closing the secondary coil S in a circuit of low resistance.

Assuming that the car and track elements L and T, respectively, shown in Fig. 1 are connected through the slip rings in a circuit as illustrated in Fig. 2, the car element being magnetized by current flowing through the primary coil P, thus causing a small amount of flux to link with the secondary coil S; but this flux is very small on account of the large air gap between the pole pieces 10 of the car element L. As the frame F is now rotated by the motor M, the car element L will pass by the track element T at a speed which may be observed on the dial of the speed responsive device G.

Assuming that the push button 47 is depressed, thus putting the coils of the track element T in an open circuit, the passage of the car element L thereby as the rotor is rotated will cause a momentary reduction of the reluctance through the core 9 of the car element. This momentary reduction of the reluctance causes an increase of flux through the primary and secondary coils of the element L, this flux being partly due to diversion of flux from leakage paths and partly due to an increase of the total flux through the primary coil. As soon as the car element L comes out of the range of influence of the track element T, the magnetism again reduces to its original normal value. This rapid change of flux to a maximum and then back to a normal value causes the generation of an E. M. F. in the secondary coil approaching that of a single cycle of alternating current. This induced voltage will, however, not affect the relay, because the current produced by this voltage will be dissipated in a closed circuit through the normally closed contact of the selector switch, which may be traced as follows: Beginning at secondary coil S, wire 54, ring 34, brush 39, wires 55 and 58, spring finger 27, contact 29, wire 52, brush 40, ring 35 and wire 53 back to the secondary coil S.

When the hub gets to the position to allow the roller to fall in the notch 22, this dissipating circuit will be opened and the voltage will be impressed on the winding of the electro-responsive device 49 with the battery 50 in series. This battery 50 is connected in the circuit in a manner so that its voltage opposes the first wave of the cycle of E. M. F. generated in the secondary coil S. Therefore, as the first wave of voltage is generated in the secondary coil S in opposition to that of the battery 50, the flow of current through the electro-responsive device 49 will be reduced to a certain value which under satisfactory conditions is sufficient to cause the electro-responsive device to drop its armature.

Assume now that a similar experimental test is to be conducted with the track element T in its normal or closed circuit condition. Under this condition, insufficient voltage will be generated in the secondary coil S provided the air gap and other variable factors are properly adjusted. The reason for not receiving a control influence from the secondary coil S under these conditions, is because the track element T will not permit a sudden change of flux therethrough. This is accounted for by the fact that a slight change of flux through the track element T will set up sufficient current in the closed circuit winding which by well-known principles of alternating current is in a direction to oppose the flux producing it, that is, the flux of the car element L. It is thus seen that by providing suitable meters and adjustable resistances, trial tests may be made under both the clear and danger conditions of the train control apparatus with a large variation of the constants of the equipment, such as air gap, magnetizing current, adjustment of the electro-responsive device, speed, voltage in the secondary circuit, etc.

The selecting device D has been provided so that only one of a large number of influences preceding and following it will be transmitted to the electroresponsive device. This is done so that the operation of the device more nearly approaches that in actual practice, and also to allow sufficient time for the electro-responsive device to pick up and the current in the several circuits to come to a normal and stable value.

Figure 3:
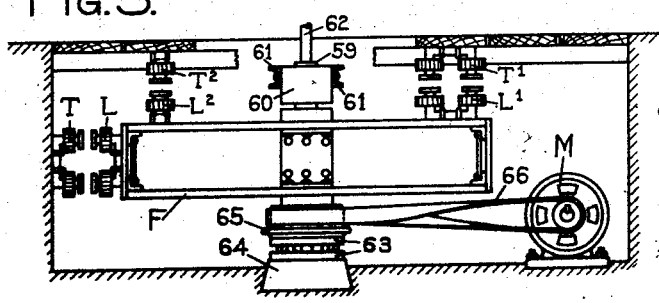
Fig. 3 is a modified form of the apparatus in which the rotatable member is mounted in a pit below the surface of the ground.

In Fig. 3 has been illustrated a modified form of the invention, in which the rotatable frame F is mounted on a vertical axis, in a pit below the surface of the ground. The top end of the main shaft 59 is provided with a journal block 60 bolted between cross beams 61 of channel iron. This end of the shaft is hollowed and provided with a tubular extension 62 carrying the selector D, collector rings C and the beveled gear of the speed responsive device (not shown) similar to that of Fig. 1. The bottom end of the main shaft 59 is provided with a thrust roller bearing 63 resting on a suitable foundation 64. The frame or rotor F may be rotated by any suitable means, and has been shown provided with a flanged pulley 65 driven by a belt 66 from a motor M.

Three sets of elements L, $L^1$ and $L^2$ are shown mounted on the frame F in cooperative relation with the track elements T, $T^1$ and $T^2$. The elements L and T are mounted similarly to the elements shown in Fig. 1. The elements $L^1$ and $T^1$ are similarly mounted for crosswise movement with respect to each other, but are mounted on the side of the frame F. It should be noted that this latter arrangement facilitates the testing of elements at a very small air gap without making the poles arcuate as would be required if mounted on the end of the frame. The elements $L^2$ and $T^2$ are shown mounted on the side of the frame for lengthwise movement by each other, only one of the legs and coils of the U-shaped member being visible. The operation of this device is similar to that illustrated in Fig. 1, and further description of its operation is believed unnecessary. Some advantages of the modified form shown in Fig. 2 over that in Fig. 1 are that the elements may be mounted on the side of the frame, thereby making the air gap a plane instead of a cylindrical surface; and further the danger of parts flying off due to centrifugal force is minimized, in that, they would be directed outwardly in the pit where no one is apt to be while the rotor F is in motion.

Apparatus for testing intermittent train control devices has thus been provided which facilitates the testing and developing of such devices in a simple and efficient manner, very closely approximating actual working conditions, in which a speed responsive device is provided which indicates the speed of a moving element at all times. For testing certain devices which are affected by crossing rails at various angles, and other magnetic or magnetized bodies found along the trackway, the presence of such bodies may be duplicated by mounting them about the rotor F of Fig. 1, or on the side of the rotor F of Fig. 3, at a suitable point with respect to the track element.

The apparatus embodying the present invention, therefore, enables experimental tests of a widely varying character of different kinds of train control devices to be made in a relatively small space, and at very small expense; and further a large number of repeated influences may be obtained at any particular speed which is desirable in certain research work, this being almost impossible under actual service tests. Such tests are for most purposes just as reliable and valuable as if made under actual working conditions.

Although several specific embodiments of the invention have been illustrated, it should be noted that this is merely illustrative. For instance, other types of inductive devices and various types of intermittent train control devices may be tested by making obvious changes, and it should be understood that such changes may be made without departing from the spirit or scope of the present invention.

What I claim is:—

1. A testing apparatus comprising, a rotor carrying one element of communicating devices of a train control system, means for driving said rotor at various speeds, means for intermittently opening and closing a circuit as the rotor rotates, and means for conducting current from a stationary source of supply to the element on said rotor.

2. A testing device comprising, a rotor, a communicating element of a train control system supported on said rotor, a cooperating stationary element adapted to influence the element on said rotor through an air gap, means for transmitting said influence to stationary apparatus, and means to select one out of a series of such influences.

3. In a device for testing inductive influence transmitting apparatus for automatic train control systems, a rotor, an inductive communicating device removably mounted on said rotor, a cooperating stationary communicating device, means for adjusting the air-gap between said devices, means for driving said rotor at various speeds and means for indicating the speed of the rotor.

4. In a device for teting inductive influence transmitting apparatus for automatic train control systems, a rotor, an inductive receiving device removably mounted on said rotor, a cooperating adjustably mounted stationary transmitting device, means for transmitting electrical impulses from said receiving device to a stationary instrument, means for driving said rotor and means for indicating the speed of said rotor.

5. In a device for testing inductive influence transmitting apparatus for automatic train control systems, a rotor, an inductive impulse receiving device mounted on said rotor, a stationary impulse transmitting device mounted to cooperate with said receiving device when said rotor is rotated, means for adjusting the air-gap between said receiving device and said transmitting device, means for conducting power from a stationary source to said receiving device and for delivering impulses from said receiving device to stationary apparatus, means for driving said rotor at variable speeds and means for indicating the speed of said rotor.

6. In a device for testing inductive influence transmitting apparatus for automatic train control systems, a rotor, an inductive impulse receiving device mounted on said rotor, a stationary impulse transmitting device mounted to cooperate with said receiving device whereby an impulse is induced in said receiving device when said devices cooperate in the rotation of said rotor, means for adjusting the clearance between said devices, means for conducting power from a stationary source to said receiving device, means for transmitting said impulses from said receiving device to stationary apparatus at predetermined intervals, means for driving said rotor and means for indicating the speed of said rotor.

In testimony whereof I hereby affix my signature.

WINTHROP K. HOWE.